(12) United States Patent
Reial

(10) Patent No.: US 7,822,104 B2
(45) Date of Patent: Oct. 26, 2010

(54) AVERAGING A DELAY PROFILE IN A LIMITED DELAY RANGE

(75) Inventor: Andres Reial, Lund (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1066 days.

(21) Appl. No.: 10/558,500

(22) PCT Filed: May 14, 2004

(86) PCT No.: PCT/EP2004/005343

§ 371 (c)(1),
(2), (4) Date: Sep. 25, 2006

(87) PCT Pub. No.: WO2004/107597

PCT Pub. Date: Dec. 9, 2004

(65) Prior Publication Data

US 2007/0041432 A1    Feb. 22, 2007

Related U.S. Application Data

(60) Provisional application No. 60/476,336, filed on Jun. 6, 2003.

(30) Foreign Application Priority Data

May 27, 2003    (EP)    ................... 03388040

(51) Int. Cl.
*H04B 1/00*    (2006.01)
(52) U.S. Cl. ................... 375/148; 375/130; 375/335
(58) Field of Classification Search ................ 370/335; 375/130, 148
See application file for complete search history.

(56) References Cited

U.S. PATENT DOCUMENTS

2001/0046221 A1    11/2001    Ostman et al.

FOREIGN PATENT DOCUMENTS

| EP | 1 091 501 A | 4/2001 |
|---|---|---|
| EP | 1 126 627 A | 8/2001 |
| EP | 1 128 563 A | 8/2001 |
| EP | 1 162 757 A | 12/2001 |
| EP | 1 286 475 A | 2/2003 |

OTHER PUBLICATIONS

European Patent Office; International Search Report for PCT/EP2004/005343 dated Aug. 9, 2004.

*Primary Examiner*—Shuwang Liu
*Assistant Examiner*—Michael R Neff (57) ABSTRACT

Multipath components of a signal transmitted through a time-varying digital radio channel are received with individual delays ($\tau$) within a range of possible delay values. An instantaneous delay profile indicating an instantaneous magnitude ($g(\tau)$) for each of a number of individual delays ($\tau$) is calculated repetitively, and an averaged delay profile indicating an averaged magnitude for the individual delays is generated from a number of repetitively calculated instantaneous delay profiles. The averaged delay profile is limited to comprise only delay values in a subset ($W_1$, $W_2$, $W_3$) of the range of possible delay values. The delay of each individual multipath component is estimated from the averaged delay profile; and at least some estimated delays are used for RAKE combining. In this way, the benefits of an averaged delay profile are achieved without the need for the additional storage and computational resources normally required by a general averaged delay profile image.

7 Claims, 7 Drawing Sheets

AVERAGING A DELAY PROFILE IN A LIMITED DELAY RANGE

This application claims the benefit of U.S. Provisional Application No. 60/476,336, filed Jun. 6, 2003, the disclosure of which is fully incorporated herein by reference.

TECHNICAL FIELD OF THE INVENTION

The invention relates to a method of detecting multipath components in a time-varying fading radio channel in a digital wireless communications system in which individual multipath components of a signal transmitted through said channel are received with individual delays within a range of possible delay values. The method comprises the steps of calculating repetitively an instantaneous delay profile indicating an instantaneous magnitude of each individual delay value; generating an averaged delay profile from a number of repetitively calculated instantaneous delay profiles; estimating from said averaged delay profile the delay of each individual multipath component; and using at least some of said estimated delays for RAKE combining. The invention further relates to a receiver having means for detecting multipath components in a time-varying fading radio channel.

DESCRIPTION OF RELATED ART

In wireless communications systems the physical channel between a transmitter and a receiver is typically formed by a radio link. As an example, the transmitter could be a base station, and the receiver could be a mobile station, or vice versa. In most cases the transmit antenna is not narrowly focused towards the receiver. This means that the transmitted signals may propagate over multiple paths. In addition to a possible direct path from the transmitter to the receiver, many other propagation paths caused by reflections from objects in the surroundings exist. Thus, the receiver may receive multiple instances of the same signal at different times, i.e. with different delays, because different portions of the signal are reflected from various objects, such as buildings, moving vehicles or landscape details.

These different portions of the signal are a cause of interference in the receiver. Depending on the time resolution of the transmission system and the instantaneous phase relationship, portions with similar propagation distances combine at the receiver and form a distinct multipath component. The effect of the combining depends on the instantaneous relationship of the carrier wavelength and distance differences, and it may thus for a given multipath component be either enhancing or destructive. In case of destructive interference, the combining leads to significant decrease of the magnitude, or fading, of the path gain for that path.

This interference is treated differently in different transmission systems. Many transmission systems try to reduce the effect of multipath propagation and fading by using receivers that combine the data symbol energy from all multipath components. In Code Division Multiple Access (CDMA) and Wideband Code Division Multiple Access (WCDMA) systems the energy of the different received portions of the signal may be utilized in the receiver by using a so-called RAKE receiver.

In these systems spreading and despreading is used. Data are transmitted from the transmitter side using a spread spectrum modulation technique wherein the data are scattered across a wide range of frequencies. Each channel is assigned a unique spreading code that is used to spread the data across the frequency range. The spreading code is a pseudo-random noise (PN) code and is composed of e.g. a binary sequence of 1's and 0's, called "chips", that are distributed in a pseudo-random manner and have noise-like properties. The number of chips used to spread one data bit, i.e. chips/bit, may vary, and it depends, at least in part, on the data rate of the channel and the chip rate of the system.

In the receiver the received signal must be despread and demodulated with the same spreading code using the same chip rate to recover the transmitted data. Furthermore, the timing of the demodulation must be synchronized, i.e. the despreading code must be applied to the received signal at the correct instant in time, which can be difficult due to the multipath effects mentioned above. The performance of a CDMA receiver is improved if the signal energy carried by many multipath components is utilized. This is achieved by using a RAKE receiver, where each multipath component is assigned a despreader whose reference copy of the spreading code is delayed equally to the path delay of the corresponding multipath component. The outputs of the de-spreaders, i.e. the fingers of the RAKE receiver, are then coherently combined to produce a symbol estimate.

Thus the RAKE receiver requires knowledge of the multipath delays and the values of the channel impulse response for all paths. To achieve the best possible signal-to-noise ratio (SNR) at the output of the RAKE combiner, the signal energy from as many physical paths as possible should be collected. In addition, tracking as many different physical paths as possible (higher utilized diversity) significantly increases the robustness of reception, since this reduces the probability of a simultaneous deep fade of all paths, a phenomenon leading to serious and sometimes catastrophic degradation of the block error rate (BLER).

The structure of the propagation channel, i.e. the absolute and relative delays of the individual multipath components, does not remain constant over time. Due to relative movement of the transmitter, the receiver and the objects in their vicinity, the delays of existing paths change, old paths disappear and new paths appear. In addition, the frequency offset between the transmitter and receiver circuits gives rise to a slow clock drift, which manifests itself as a gradual movement of the whole delay profile along the time axis. To ensure proper operation of the RAKE receiver, the changing delays of all known multipath components should be tracked, and new paths should be discovered quickly after they appear.

An approach to delay estimation in a RAKE receiver implementation could involve evaluating repetitively the impulse response of the channel over the whole range of possible delays of the channel. The resulting delay profile, which may be a complex delay profile or a power delay profile, may then be subjected to peak detection, and the peak locations are reported to the RAKE receiver as the delay estimates. However, the processing and power consumption expense of frequently executing this full path searching routine is usually prohibitive.

Therefore, typical implementations may use path searchers with observation windows shorter than the full search area. In addition, the path searcher resolution may be reduced and additional densely-sampled windows of de-spreaders may be used that produce higher-resolution estimates of certain areas of the delay profile. In any case, in a practical delay estimation system the path searcher stage is used periodically to re-scan the delay range with the purpose of detecting new paths.

Typically, these implementations are intrinsically instantaneous, i.e. the processing chain is only aware of the instantaneous image of the delay profile and a particular step in the algorithm can be performed based solely on the information collected by the previous stage. Under certain demanding channel conditions such operation based on the instantaneous delay profile does not yield satisfactory results. When the signal-to-interference ratio is low, the peaks in the delay profile may be difficult to distinguish instantaneously. In case of wide delay spread, the precise path searcher window placement is critical to avoid missing paths with significant energy, and in case of fading effects, the detection and tracking of paths depends on the instantaneous path magnitude at the time of the path searcher pass, etc.

These problems may be alleviated by building some temporal averaging into the algorithm so that the critical parameters change slower than the fading rate of the multipath components. Thus in JP 10-190522 an average delay profile is generated and thresholded for executing RAKE synthesization. One approach of including averaging entails maintaining an averaged delay profile buffer as the core of the algorithm, where all information from all delay profile evaluation operations is collected and saved, and this composite information is used to report the delay estimates and control all delay estimator algorithm functions. Thus, in steady state operation, the averaged delay profile buffer contains a delay profile estimate where the true path positions are discernible even when a path is temporarily faded.

The averaging-based approach provides a significant improvement in the robustness of the delay estimator compared to the traditional instantaneous delay estimator methods, because it maintains the full averaged delay profile for the whole range of possible path delays.

However, its usage implies the need to store the image of the delay profile between subsequent delay estimator operations and path searcher activations. In addition, since in some systems the path searcher stage may be implemented as a separate hardware block, the extensive amount of data provided by the path searcher may need to be transferred into the memory. Also, in a soft handover situation when a terminal is in communication with several base stations, an averaged delay profile image must be maintained for every such base station separately. Consequently the associated storage and data transfer requirements may pose problems in many systems, especially those where the available memory and processing capacity is severely limited, e.g. a downlink receiver in a hand-held mobile terminal.

Therefore, it is an object of the invention to provide a method that avoids the problems of the instantaneous delay profile mentioned above without the need for extensive additional storage and computational resources required by using a general averaged delay profile image.

SUMMARY

According to the invention the object is achieved in that the method comprises the step of limiting the generation of an averaged delay profile to comprise only delay values in a subset of said range of possible delay values.

When the generation of the averaged delay profile is limited to a subset of the delay range, the required computational resources and storage is reduced correspondingly while the benefits of averaging based delay estimator processing are still achieved to a large degree. These benefits include that long-term tracking of paths across fading is accomplished, allowing high-quality interference and power estimation for each RAKE finger. Further, paths are automatically re-discovered as they return from deep fades, without requiring a path searcher run to detect them. In a steady-state operation, the sensitivity to path searcher window placement errors is significantly reduced. The true path positions are discernible in the limited averaged delay profile even while they are not visible in the instantaneous delay profile.

Expediently, the generation of the averaged delay profile may be limited to delay values situated in regions around currently estimated multipath components. By using this subset it is ensured that the current multipath components are included in the subset while delay values located distantly from the current multipath components are avoided in the calculations.

Since the subset will typically comprise several disjoint regions, the delays of the individual multipath components may be estimated from the limited averaged delay profile by joint peak detection over said regions around currently estimated multipath components. In this way it is ensured that all relevant peaks are correctly detected.

The limited averaged delay profile may be generated repetitively at a first rate, and a search for new multipath components may be performed repetitively at a rate lower than said first rate, said search comprising the steps of computing a position for a search window from said limited averaged delay profile; calculating an instantaneous search delay profile indicating an instantaneous magnitude for each delay value in said search window; detecting peaks in said instantaneous search delay profile; and including, if peaks are detected outside the regions of said limited averaged delay profile, delay values in a region around such peaks in the limited averaged delay profile. By searching for paths outside the limited averaged delay profile and including delays around such paths if found, it is achieved that new paths are not over-looked by limiting the generation of the averaged delay profile to a subset of the delay values.

When the method further comprises the step of discarding a region from the limited averaged delay profile if the averaged magnitudes for the delay values of such region are detected to assume values below a threshold, it is ensured that computational resources are not wasted by calculating the averaged delay profile around old paths that are disappeared.

Expediently, the method may further comprise the step of storing for each individual multipath component the following information: the center position of the region around that multipath component; locations of neighbouring multipath components; and delay profile magnitudes for each delay value situated in the region. The method may also comprise the step of storing for each individual multipath component a flag indicating whether that multipath component corresponds to a newly included region in the limited averaged delay profile.

As mentioned, the invention further relates to a receiver having means for detecting multipath components in a time-varying fading radio channel in a digital wireless communications system in which individual multipath components of a signal transmitted through said channel are received with individual delays within a range of possible delay values, the receiver being adapted to calculate repetitively an instantaneous delay profile indicating an instantaneous magnitude for each of a number of individual delay values; generate an averaged delay-profile from a number of repetitively calculated instantaneous delay profiles, said averaged delay profile indicating an averaged magnitude for said number of individual delay values; estimate from said averaged delay profile the delay of each individual multipath component; and use at least some of said estimated delays for RAKE combining. The receiver is further adapted to limit the generation of said averaged delay profile to comprise only delay values in a subset of said range of possible delay values. In this way a receiver is provided that avoids the problems of the instantaneous delay profile mentioned above without the need for extensive additional storage and computational resources required by using a general averaged delay profile image.

Expediently, the receiver may further be adapted to limit the generation of the averaged delay profile to delay values situated in regions around currently estimated multipath components. By using this subset it is ensured that the current multipath components are included in the subset while delay values located distantly from the current multipath components are avoided in the calculations.

Since the subset will typically comprise several disjoint regions, the receiver may further be adapted to estimate the delays of the individual multipath components from said limited averaged delay profile by joint peak detection over said regions around currently estimated multipath components. In this way it is ensured that all relevant peaks are correctly detected.

The receiver may be adapted to generate said limited averaged delay profile repetitively at a first rate, and the receiver may comprise means for performing a search for new multipath components repetitively at a rate lower than said first rate, said search means being adapted to compute a position for a search window from said limited averaged delay profile; calculate an instantaneous search delay profile indicating an instantaneous magnitude for each delay value in said search window; detect peaks in said instantaneous search delay profile; and include, if peaks are detected outside the regions of said limited averaged delay profile, delay values in a region around such peaks in the limited averaged delay profile. By adapting the receiver to search for paths outside the limited averaged delay profile and include delays around such paths if found, it is achieved that new paths are not overlooked by limiting the generation of the averaged delay profile to a subset of the delay values.

When the receiver is further adapted to discard a region from said limited averaged delay profile if the averaged magnitudes for the delay values of such region are detected to assume values below a threshold, it is ensured that computational resources are not wasted by calculating the averaged delay profile around old paths that are disappeared.

Expediently, the receiver may further be adapted to store for each individual multipath component the following information: the center position of the region around that multipath component; locations of neighbouring multipath components; and delay profile magnitudes for each delay value situated in the region. The receiver may also be adapted to store for each individual multipath component a flag indicating whether that multipath component corresponds to a newly included region in the limited averaged delay profile.

BRIEF DESCRIPTION OF THE DRAWINGS

The invention will now be described more fully below with reference to the drawings, in which.

DETAILED DESCRIPTION OF EMBODIMENTS

Figure 1:
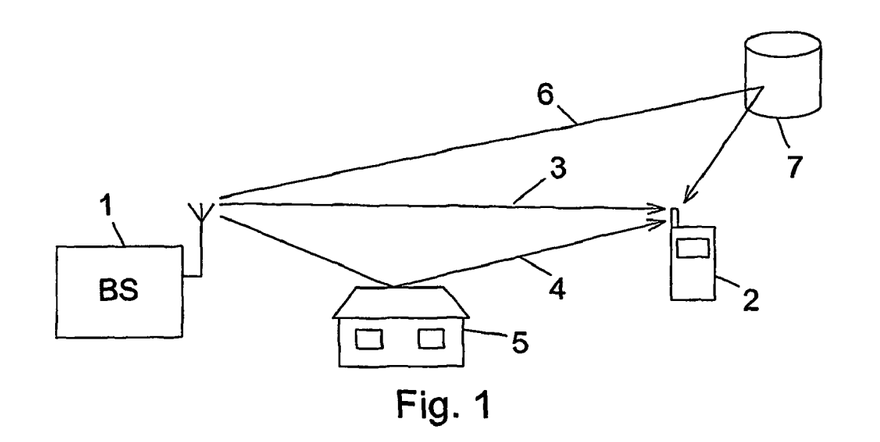
FIG. 1 shows an example of multiple paths between a base station and a mobile station.

FIG. 1 shows a situation in which a base station 1 and a mobile station 2 of a wireless communications system communicate with each other. As an example, a signal transmitted from the base station 1 is received by the mobile station 2. However, the transmitted signal travels along multiple paths from the base station to the mobile station. In this case there is a direct and unobstructed propagation path 3, but in addition to this direct path, reflections from objects in the surroundings cause a number of indirect paths to exist. Two such paths are shown in the figure. One indirect path 4 is reflected from a house 5, while another path 6 is caused by reflection from another building 7.

Since the part of a signal transmitted via one of the indirect paths 4 and 6 has to travel a longer distance to arrive at the mobile station 2, compared to the part of the signal travelling via the direct path 3, multiple instances of the same signal will be received by the mobile station 2 at different times, i.e. with different delays.

Figure 2:
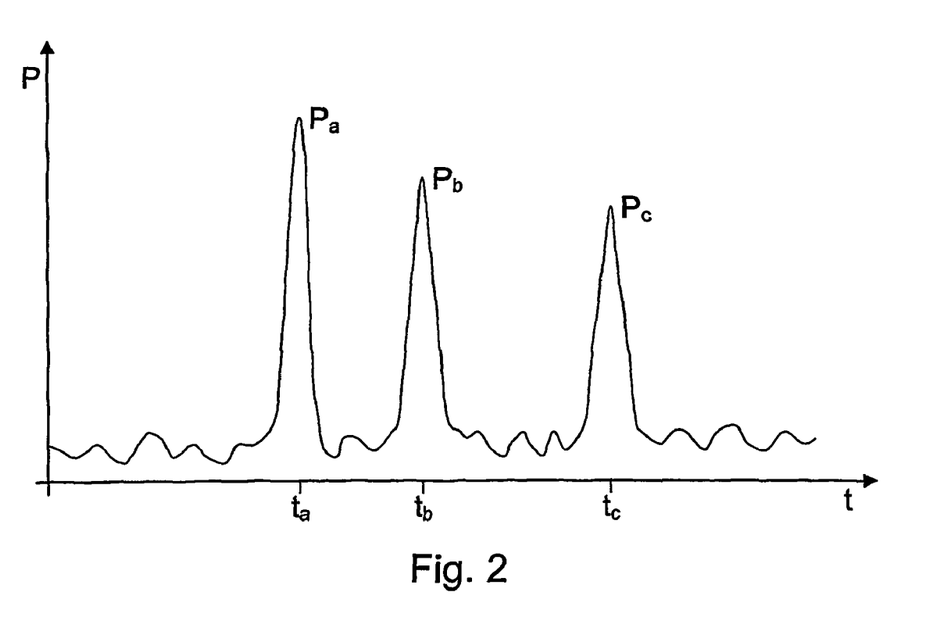
FIG. 2 shows a power delay profile for the paths illustrated in FIG. 1.

Thus, if a pilot signal is transmitted from the base station 1, the power P received at the mobile station 2 as a function of the time t may look as illustrated in FIG. 2, which shows an example of a power delay profile. The power delay profile shows all signals received at the mobile station, including noise and interference signals. However, only the peaks in the power delay profile correspond to the multipath components of the transmitted signal. Together these peaks form the impulse response of the channel. In FIG. 2 the peak $P_a$ received at the time $t_a$ corresponds to the direct path 3 in FIG. 1, while the peaks $P_b$ and $P_c$ received at the times $t_b$ and $t_c$, respectively, correspond to the indirect paths 4 and 6 in FIG. 1. Thus, as an example, it is seen that the delay of the path 6 (corresponding to the peak $P_c$) is larger than the delay of the path 3 (corresponding to the peak $P_a$).

The mobile station 2 and the base station 1 may be adapted for use in e.g. a Code Division Multiple Access (CDMA) system or a Wideband Code Division Multiple Access (WCDMA) system, and in that case the mobile station 2 may use a RAKE receiver, which is capable of identifying and tracking the various multipath signals for a given channel. In this way the energy or power of several multipath components can be utilized in the receiver. As mentioned above, this may be achieved by using a RAKE receiver, where each multipath component is assigned a despreader whose reference copy of the spreading code is delayed equally to the path delay of the corresponding multipath component. The outputs of the despreaders, i.e. the fingers of the RAKE receiver, are then coherently combined to produce a symbol estimate. Thus the RAKE receiver requires knowledge of the multipath delays and the values of the channel impulse response for all paths. The signal energy from as many physical paths as possible should be collected.

Figure 3:
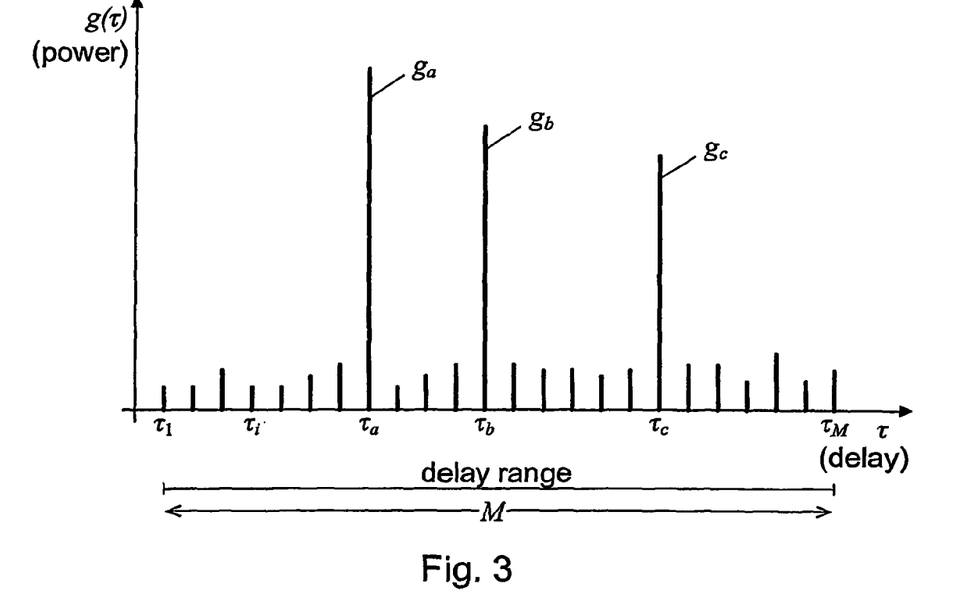
FIG. 3 shows a sampled power delay profile corresponding to the profile shown in FIG. 2.

Typically, the delay profile of the received signal will not be available as a continuous curve as the one illustrated in FIG. 2. Instead, it will consist of a number of sample values. This is illustrated in FIG. 3, which shows a sampled power delay profile corresponding to the continuous delay profile shown in FIG. 2. For each delay value $\tau_i$, the corresponding power value $g(\tau_i)$ is shown. In this case the available estimates of the power delay profile constitutes a contiguous sequence of equally spaced samples, $\tau_i = \tau_0 + i\Delta\tau$. Thus the power values $g_a$, $g_b$ and $g_c$ at the delay values $\tau_a$, $\tau_b$ and $\tau_c$ correspond to the peaks $P_a$, $P_b$ and $P_c$ shown in FIG. 2.

Although reference is here made to a RAKE receiver in a mobile station, it should be noted that the algorithms described below may be used at any CDMA receiver, i.e. in a mobile station or a base station, and the transmission may be uplink or downlink.

Since the structure of the propagation channel does not remain constant over time, the delays of existing paths change, old paths disappear and new paths appear. The changing delays of all known multipath components should be tracked, and new paths should be discovered quickly after they appear.

Figure 4:
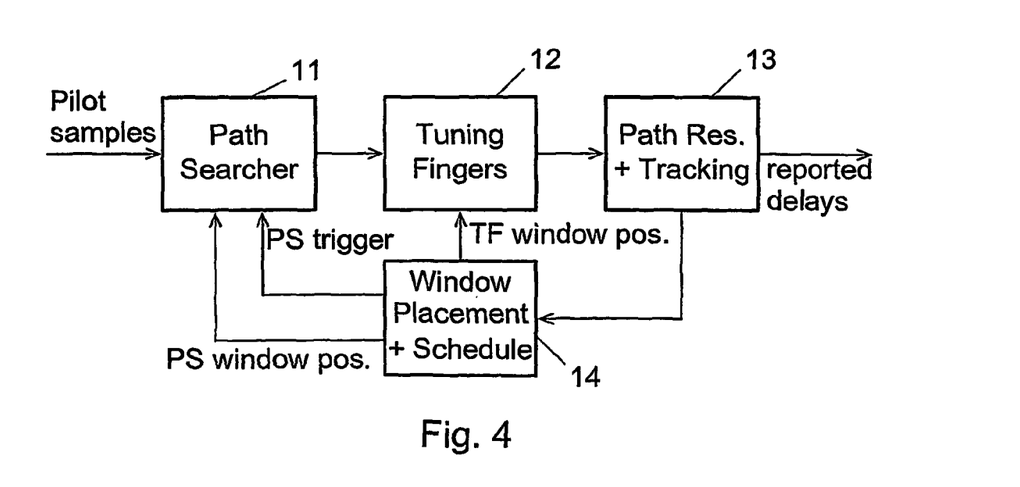
FIG. 4 illustrates a typical structure of delay estimation using a path searcher to detect new paths.

In order to estimate the path delays in the RAKE receiver, the impulse response of the channel could be evaluated over the whole range of possible delays in the channel, and the resulting delay profile could then be subjected to peak detection and the peak locations reported to the RAKE receiver as the delay estimates. However, the processing and power consumption of executing such a full path searching routine frequently is usually so high that it cannot be realized in a practical system. Therefore, infrequently activated limited-range path searchers are typically used for detecting new paths and, in some implementations, for re-detecting temporarily faded existing paths. This is illustrated in FIG. 4.

The path searcher 11 is a device that repetitively computes instantaneous impulse response estimates (complex or power) over a range of delays that constitutes a significant fraction of the maximal delay spread allowed by the system. The delay profile for a given delay value is estimated e.g. by correlating the received data for pilot symbols with an appropriately delayed copy of the spreading sequence, a method well known in the art. Since the path searcher 11 is mainly used only to detect the existence of paths, its output resolution may be lower than that required by the RAKE receiver.

The RAKE receiver itself uses a general delay estimation algorithm, which is able to extract the path positions and find their delays with sufficient accuracy, once they are discovered by the path searcher 11. This can be performed e.g. by the tuning finger device 12, which is a device for producing a high-resolution instantaneous delay profile over a narrow delay window. Tuning fingers are commonly used to locally refine the coarse delay profile information provided by the path searcher.

Physical path location information is then extracted from the path searcher and tuning finger output by the path resolving, tracking, and reporting unit 13, which is a set of signal processing and logical algorithms, and delay estimates presented consistently to the subsequent RAKE receiver stages. The unchanging assignment of paths to RAKE fingers is necessary to support power and interference estimation for each finger. The degree of complexity of these algorithms varies significantly depending on system parameters, ranging from simple peak detection to sophisticated de-convolution and filtering.

The device 14 for scheduling and window placement is a control logic which determines the timing of path searcher and tuning finger activation and their window positions for each cycle. The timing may be fixed (periodic) or depend on signals derived from the environment, while the positioning usually depends on the location of previously detected paths.

The architecture illustrated in FIG. 4 is intrinsically instantaneous, i.e. in a simple implementation, the processing chain is only aware of the instantaneous image of the delay profile, and a particular step in the algorithm can be performed based solely on the information collected by the previous stage. However, as mentioned, it is often found that such memory-less operation does not yield satisfactory results under certain demanding channel conditions, such as low signal-to-interference ratio, wide delay spread or fading effects. The peaks in the delay profile due to physical paths may be difficult to distinguish instantaneously, the precise path searcher window placement may be critical to avoid missing paths with significant energy, or, in case of fading effects, the detection and tracking of paths may depend on the instantaneous path magnitude at the time of the path searcher pass.

These problems may be alleviated by building some temporal averaging into the algorithm so that the critical parameters change slower than the fading rate of the multipath components.

One approach to this temporal averaging entails maintaining an averaged delay profile buffer as the core of the algorithm, where all information from all delay profile evaluation operations is collected and saved, and this composite information is used to report the delay estimates and control all delay estimator algorithm functions.

Figure 5:
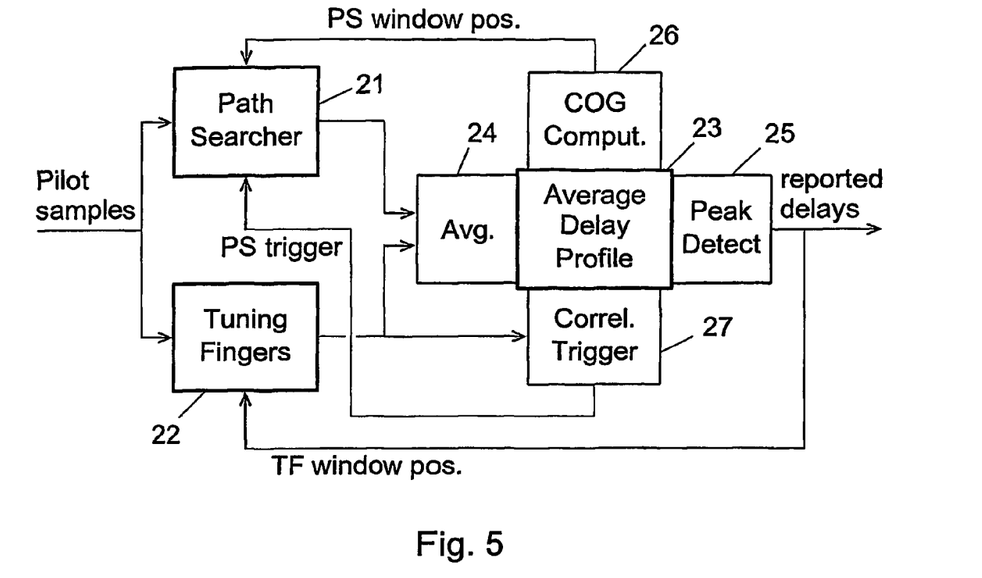
FIG. 5 shows an averaging-based delay estimation structure with a full averaged delay profile buffer.

A simplified structure of this averaging-based method is shown in FIG. 5, in which the path searcher 21 and the tuning fingers 22 correspond to the path searcher 11 and the tuning fingers 12 in FIG. 4. The delay profile output from every path searcher and tuning finger pass is accumulated in an average delay profile buffer 23 that maintains averaged delay profile estimates for the whole allowable delay spread range. The averaged estimates are calculated in the averaging unit 24. Thus, in steady state operation, the average delay profile buffer 23 contains a delay profile estimate where the true path positions are discernible even when a path is temporarily faded. The path searcher 21 is used to discover new activity, not currently reflected in the average delay profile buffer 23. The tuning fingers are used to provide delay profile updates for the regions where currently detected paths exist.

The averaged delay profile buffer 23 is then used to provide all logical support functions for delay estimation. Delay estimation and reporting is performed directly from the average delay profile buffer 23, e.g. using peak detection 25. Path tracking, i.e. mapping a particular path to a specific position in the report list to accommodate interference and power estimation, is accomplished naturally via the average delay profile buffer 23. Path Searcher window placement is based on the information in the average delay profile buffer 23, e.g. by computing its centre of gravity (COG) in the COG unit 26. The tuning finger window placement is based on the information in the average delay profile buffer 23, e.g. by peak detection in unit 25. The trigger unit 27 takes care of regular and/or event-driven path searcher activation. The averaging-based approach provides a significant improvement in delay estimator robustness compared to the traditional instantaneous delay estimator methods.

As mentioned before, maintaining the full averaged delay profile for the whole range of possible path delays implies the need to store the image of the delay profile between subsequent delay estimator operations and path searcher activations. Also, in some situations an averaged delay profile image must be maintained for several base stations separately. Consequently the associated storage and data transfer requirements may pose problems in many systems, especially those where the available memory and processing capacity is severely limited, e.g. a downlink receiver in a hand-held mobile terminal.

Below, a structure is described that is able to apply the general approach of utilizing a central averaged image without the need to maintain a full-range delay profile buffer at all times. The presented delay estimator architecture achieves the benefits of averaging-based delay estimator processing, but it requires maintaining the delay profile image only in limited regions of the delay range. In addition to solving the data storage problem, the architecture also presents efficient data structures and processing methods to minimize the overhead due to a more complex structure of the stored averaged delay profile info. The structure is illustrated in FIG. 6.

Figure 6:
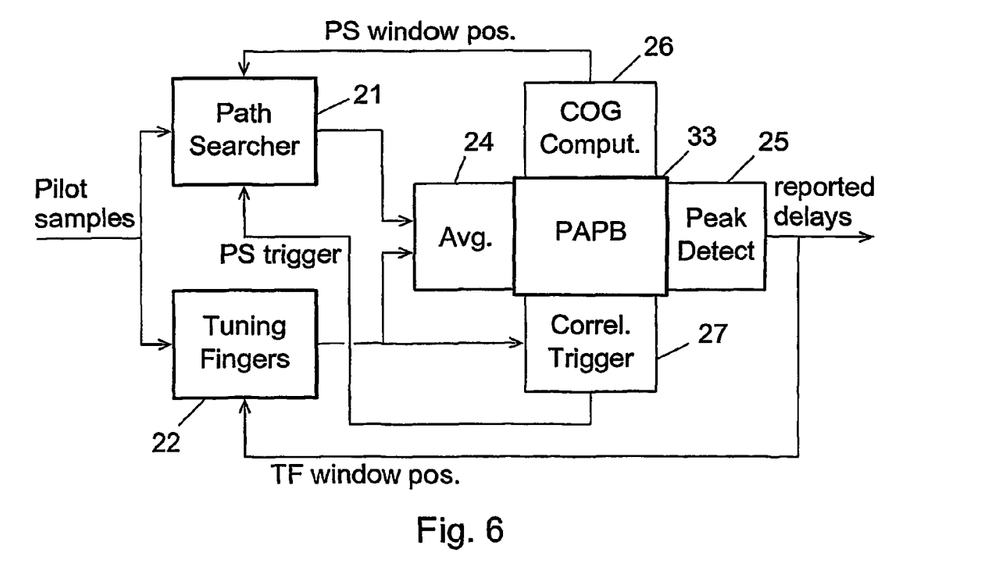
FIG. 6 shows an averaging-based delay estimation structure with a partial or limited averaged delay profile buffer.

Functionally, the architecture of FIG. 6 is the same as the one shown in FIG. 5, except that in stead of the full average delay profile buffer 23 it encompasses a limited or partial averaged delay profile buffer (PAPB) 33 from which the path delays are directly estimated and which serves as a source of reliable control information to all the other stages of the delay estimator block. The partial average delay profile buffer 33 is maintained for the sections of the channel impulse response where physical paths are currently found to exist. The delay estimator method consists of periodic, relatively frequent tracking cycles, and of periodic, relatively infrequent path searcher cycles. While the buffer 33 in the following description in most cases is designated as a partial average delay profile buffer, it should be noted that it could just as well be designated as a limited average delay profile buffer.

During a tracking cycle, the tuning fingers 22 are positioned to cover the areas included in the partial average delay profile buffer 33, and the instantaneous delay profile output from every tuning finger activation is accumulated into the partial average delay profile buffer 33. The instantaneous delay profile may be accumulated into the partial average delay profile buffer 33 using an exponential smoothing process. The averaging time constant may be adjusted to match the channel variation rate. In the steady state operation, the partial average delay profile buffer contains a delay profile estimate where the true path positions are discernible even when a path is temporarily faded. When the partial average delay profile buffer values for some region become significantly reduced, indicating a disappearance of a physical path, the region is removed from the partial average delay profile buffer 33.

During a path searcher cycle, the path searcher is used to detect new regions of path activity. When the instantaneous delay profile returned by the path searcher indicates peaks in regions that are currently not included in the partial average delay profile buffer 33, the delay profile averaging is turned on for these new regions.

The steps of these two cycles will be described later with reference to FIG. 9.

Below it is described how the partial average delay profile buffer information is used to control all constituent functions of the delay estimator stage Path searcher window placement may be based e.g. on computing the center of gravity of the partial average delay profile buffer values in the unit 26. The function of the path searcher is then to discover new activity, not currently reflected in the partial average delay profile buffer 33. Tuning finger windows are placed straddling the peaks detected in the partial average delay profile buffer 33. The task of the tuning fingers is then to provide delay profile updates for the regions where currently detected paths exist. Delay estimation and reporting is performed directly from the partial average delay profile buffer 33, e.g. using peak detection 25. Path tracking, i.e. mapping a particular path to a specific position in the report list to accommodate interference and power estimation, is accomplished directly via the averaged delay profile buffer.

In essence, the suggested architecture mimics the principle of maintaining an averaged image of the delay profile at all times, described above, treating the regions where no activity is tracked as empty. Successful operation is ensured via an appropriate placement of the tuning finger regions, which also become the sections making up the partial average delay profile buffer 33. A difference compared to the full average delay profile buffer lies in how the accumulation, peak detection, and path identity propagation operations on the partial average delay profile buffer 33 are efficiently carried out.

Figure 7A:
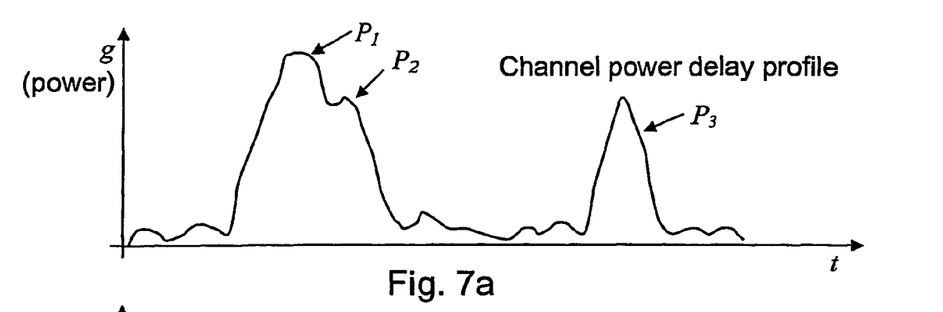
FIGS. 7*a* to 7*d* show an example of how the values of the partial average delay profile buffer are calculated.
Figure 7B:
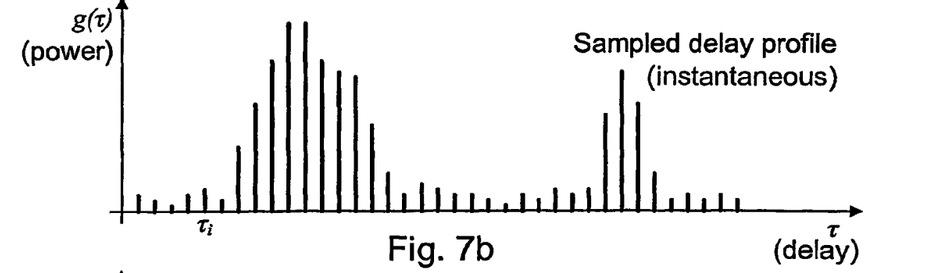
Figure 7C:
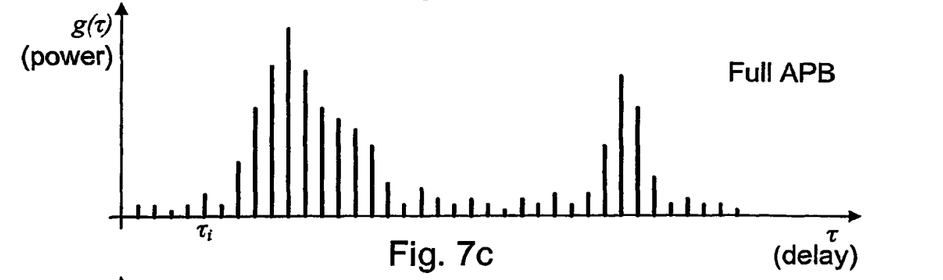

FIGS. 7a to 7d show an example of how the values of the partial average delay profile buffer 33 are calculated. FIG. 7a shows an example of an actual instantaneous power delay profile for a channel, while FIG. 7b shows the corresponding sampled power delay profile. These two figures correspond to FIGS. 2 and 3, but of course they illustrate a different channel having different paths. As indicated, there seems to be three paths $P_1$, $P_2$ and $P_3$ present in the channel at the illustrated point of time. FIG. 7c shows the values of a full averaged power delay profile buffer corresponding to the buffer 23 in FIG. 5. The values of the full averaged power delay profile buffer are obtained by combining the instantaneous power delay values (FIG. 7b) with the previous values so that the averaged values combine the information of several consecutive samples of the delay profile. It is seen that the averaged profile differs from the instantaneous profile, in the present case e.g. because the path indicated by $P_2$ is increasing in power so that the power values around this path are higher in the instantaneous profile than in the averaged profile. The calculation of the averaged values will be described later.

Figure 7D:
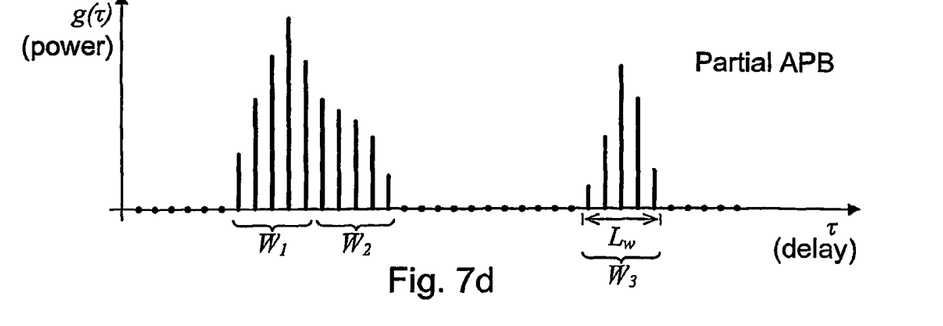

FIG. 7d illustrates that instead of calculating the averaged power values for the whole delay range, the calculation may be performed only for limited regions of the delay range, so that the values of the averaged delay profile buffer are maintained only in these regions. In the example, three regions $W_1$, $W_2$ and $W_3$, corresponding to the three paths $P_1$, $P_2$ and $P_3$, are shown. The delay values for which no averaged power values are calculated are indicated by a dot.

The partial average delay profile buffer consists of $N_t$ disjoint sections (i.e. in the illustrated case the three regions $W_1$, $W_2$ and $W_3$) of width $L_w$ each. For each section, we record its center position; the positions of the individual bins within the regions are then directly known. In order to ease the management of the minimum-spacing enforcement and admitting new paths from the path searcher, this list of tracked paths should be ordered by the center positions $x_n^{(j)}$ (i.e. the center position of path number n at the time j) of the paths, and we use the structure of a (doubly) linked list, as it allows insertion and removal of elements without disturbing the rest of the list. We thus distinguish two "positions" for each tracked path, i.e. its "memory location" in the list and its "logical" delay order in the linked list.

The "memory location" of the tracked path in the list, n, remains constant as long as the path appears to exist; it is used as the path's identity over time to maintain consistent channel and interference filtering. The "logical" delay order of the tracked path in the linked list changes as other paths are added and dropped; it is not listed explicitly but known by maintaining the locations of its neighbours in terms of delay, and it is used to efficiently enforce minimum spacing constraints.

Figure 8:
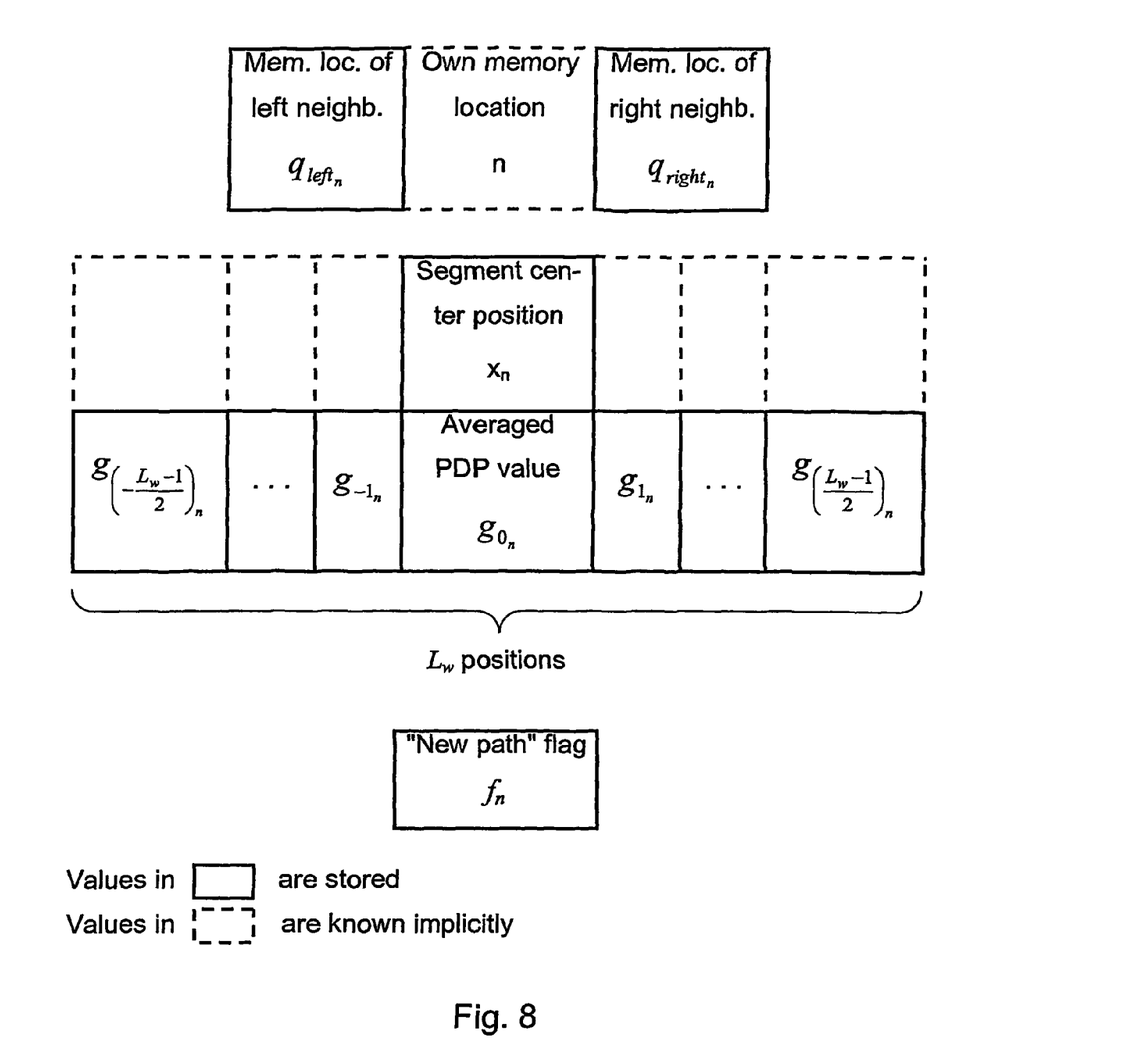
FIG. 8 shows a data structure for storing a single segment of the partial average delay profile buffer.

Thus, for each tracked path n the following information is maintained, which is also illustrated in FIG. 8 showing the data structure for storing a single segment of the partial average delay profile buffer:

center position:

$$x_n^{(j)}\left[\frac{1}{M} - \text{chips resolution}\right],$$

neighbour locations in the list: $q_{left_n}$, $q_{right_n}$,
a "new region" flag: $f_n$,
PAPB (partial average delay profile buffer) window $W_n$: $L_w$ power values $$g_{k_n}^{(j)}$$

for $$k \in \left[-\frac{L_w-1}{2}, \frac{L_w-1}{2}\right],$$

$$g_{k_n}^{(j)} \equiv g_i^{(j)},$$

where $$i = x_n^{(j)} + k.$$

In closely-spaced scenarios, the windows $W_n$ may partially overlap, but a preferred embodiment maintains the data for the full range of all these windows to simplify housekeeping. The overlap is automatically handled in the comparison stages.

Figure 9:
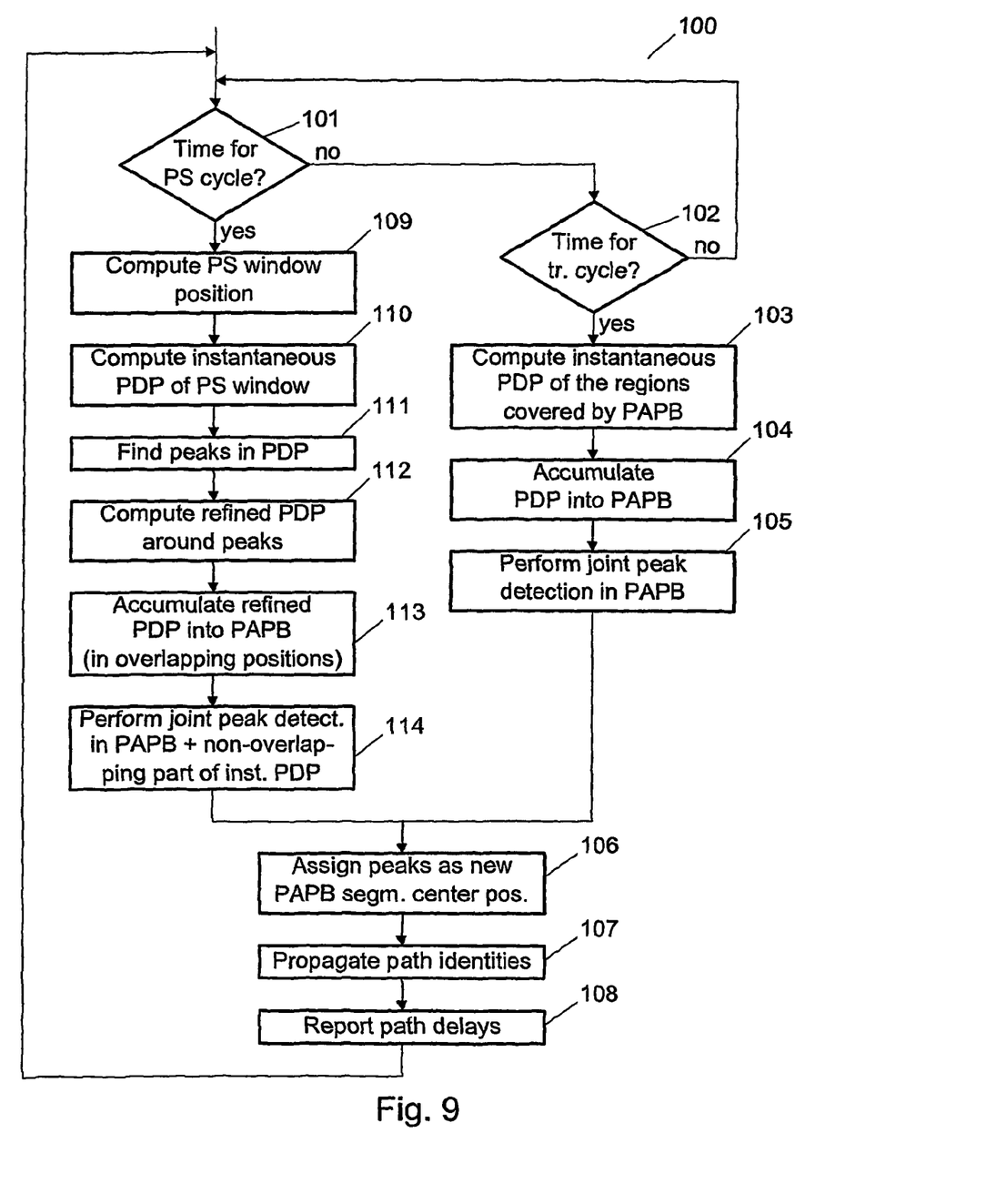
FIG. 9 shows a flow chart illustrating the steps of the suggested architecture.

The control flow and the algorithmic steps of the architecture are illustrated in the flow chart 100 in FIG. 9, in which we assume a steady-state situation, while tracking $N_t$ paths. Around each path n, we maintain a narrow section with the averaged delay profile. The $N_t$ sections together make up the partial average delay profile buffer (PAPB).

In step 101 it is detected if it is time for a new path searcher cycle. If this is not the case, it is detected in step 102 if it is time for a new tracking cycle, i.e. a run of the tuning fingers block. If not, steps 101 and 102 are repeated until it is time for one of the two cycles. As mentioned before, tracking cycles are performed much more frequent than the path searcher cycles.

When it is detected in step 102 that, at time j, a new tracking cycle is due, the instantaneous delay profile of the delays constituting the partial average delay profile buffer is computed in step 103. First, the set of delay positions to be updated are defined as:

$$U^{(j)} = \bigcup_{n=1}^{N_t}\left[x_n^{(j)} - \frac{L_{tf}-1}{2}, x_n^{(j)} + \frac{L_{tf}-1}{2}\right],$$

where the duplicates are removed and each position occurs only once. $L_{tf}$ is the width of a window around each tuning finger. $L_{tf}$ might be different from $L_w$. The fingers are then placed at the positions $i \in U^{(j)}$, and the instantaneous delay profile values $a_i^{(j)}$ are calculated.

In step 104 the newly calculated instantaneous values are then accumulated into the partial average delay profile buffer, e.g. using exponential smoothing. An example of a simple exponential smoothing method is:

$$g_i^{(j)} = \lambda g_i^{(j-1)} + (1-\lambda)a_i^{(j)}.$$

The implementation details may be solved in the following manner

The forgetting factor for the LP filtering process may be chosen as follows: given the tracking cycle of $K_t$ slots and the targeted averaging time constant of $K_{tc}$ slots, we compute $$\lambda = e^{\frac{K_t}{K_{tc}}}.$$

When no update $a_i^{(j)}$ is available for delay i, we let the averaged delay profile decay:

$$g_i^{(j)} = \lambda g_i^{(j-1)}.$$

If $a_i^{(j)}$ exists but $g_i^{(j-1)}$ is uninitialized (=0), we start from a non-zero state to accelerate the warm-up process:

if $$g_{i-1}^{(j-1)} = g_{i+1}^{(j-1)} = 0,$$

then $$g_i^{(j)} = a_i^{(j)}$$

if $$g_{i-1}^{(j-1)} \neq 0$$

or $$g_{i+1}^{(j-1)} \neq 0,$$

then $$g_i^{(j)} = \lambda \frac{g_{i-1}^{(j-1)} + g_{i+1}^{(j-1)}}{2} + (1-\lambda)a_i^{(j)}.$$

Optionally, to improve the smoothness of the averaging as the tuned regions shift within the windows of the averaged delay profile, it is also possible to store the last update instant $u_i$ for each bin position within $W_n$. The average delay profile is then updated as $$g_i^{(j)} = \lambda^{j-u_i} g_k^{(j-1)} + (1-\lambda^{j-u_i})a_i^{(j)}.$$

In this case, the averaged delay profile value for a bin that does not receive an update $a_i^{(j)}$ is not changed, $g_i^{(j)} = g_i^{(j-1)}$. The method allows the window $W_n$ to be better utilized, at the cost of maintaining an extra set of update instants $u_i$, $L_w$ of them for each tuned path.

If at the time of the implementation the Doppler estimate is available, the target time constant $K_{tc}$ should be tied to it and the forgetting factor adaptively adjusted. Preferably, this estimate should account for the fading rate, determined by the vehicular movement.

When the newly calculated instantaneous values are accumulated into the partial average delay profile buffer in step 104, the entire partial average delay profile buffer is jointly peak-detected for $N_t$ peaks with a minimum-spacing criterion in step 105. One efficient implementation of the joint peak detection task is shown in the flow chart 200 in FIG. 10. As mentioned, the peak detection is performed jointly, i.e. not individually for each position. To simplify the steps required to maintain the minimum path separation, an approach where the averaged delay profile is copied into a temporary buffer $b_i$ (possibly having the same structure as $g_i$) may be used. This is shown in step 201.

Figure 10:
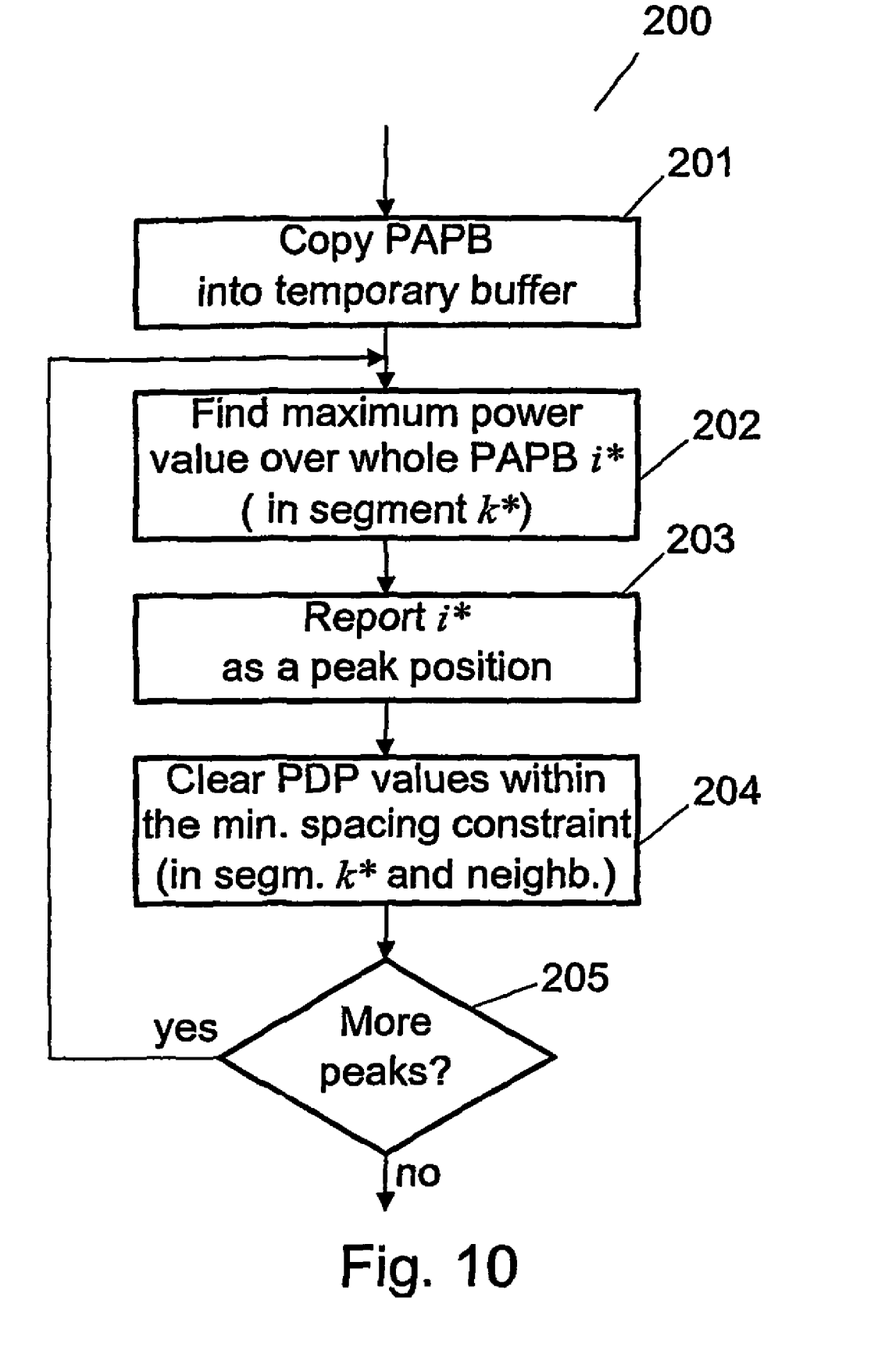
FIG. 10 shows a flow chart of an implementation of joint peak detection.

The suggested peak detection sequence is repeated for each path n=1 ... $N_t$. While the list may be cycled through in any order, the maximum peak over the whole (temporary) partial average delay profile buffer $$i^* = \underset{i \in U(j)}{\arg\max}\, b_i$$

is found (step 202), and its delay position $i^* = d_n^{(j)}$ and the position $k^*$ of the associated path n is marked in the delay-ordered list and reported as a peak position (step 203).

Then the values around the found peak are cleared in step 204. This may be done by setting $b_i = 0$ for $i \in [d_n - (L_{min}-1), d_n + (L_{min}-1)]$. Such i will only be found in one or more of the list entries $k^*-1, k^*$, and $k^*+1$, so the affected segments of $b_i$ will be immediately known using the linked list structure. If all peaks are not yet found (step 205), steps 202 to 204 are repeated until all peaks are found.

We now have the current peak position list $d_n^{(j)}$ that includes the tracking corrections for any path drift. For convenience (e.g. to support path searcher window placement) we may also want to save the averaged delay profile values corresponding to these positions, $g_{d_n^{(j)}}^{(j)}$. In best embodiments, a minimum spacing constraint is enforced, to avoid assigning paths and the segments of the partial average delay profile buffer too close to each other.

In step 106 the detected peak positions $d_n^{(j)}$ are assigned as the new path center positions $x_n^{(j+1)}$, and the partial average delay profile buffer sections will be adjusted for the next cycle, i.e. centered around the new peak positions. The averaged delay profile can then be modified by setting $g_i^{(j+1)} = g_i^{(j)}$ for the overlapping bins, initializing $g_i^{(j+1)} = 0$ for bins that were not represented in $g_i^{(j)}$, and dropping the redundant bins in $g_i^{(j)}$ that will not be present in $g_i^{(i+j)}$.

In step 107 the new peak positions, i.e. the list $d_n^{(j)}$, is then compared with those of the previous cycle, $d_n^{(j-1)}$, and the path identities are propagated if the positions differ by at most $$\frac{1}{M}$$

chips. A path that occupies a position that is no further than $$\frac{1}{M}$$

-chip from a previous path position is treated as physically the same path, and the report list should be reordered so that a given path is consistently reported in the same position in the list. This is necessary to allow for optimal channel and interference estimate filtering. (Alternatively, the report list may be in an arbitrary order but a "finger" number is carried along with each delay estimate, which accomplishes the same purpose).

At the output of the delay estimator stage, the $N_f$ largest paths out of the $N_t$ tracked ones are reported in step 108. Additionally, thresholding may be performed with respect to the largest magnitude in the averaged delay profile or with respect to the power delay profile noise floor to remove noise-induced paths. However, this function may also be left to the active finger selection block that uses instantaneous channel coefficients (and received data) to isolate the true paths.

Additionally a "new path" flag may be reported along with each delay estimate. This allows the channel estimates to warm up quickly when a hitherto unknown path is included in the list. The "new path" flag is set for path n* if in the list $d_n^{(j-1)}$ there is no entry closer than $$\frac{2}{M}$$

chips to $d_{n^*}^{(j)}$.

If in step 101 it was time for a new path searcher cycle, the path searcher window position is computed in step 109. The path searcher window may be positioned using the most recently reported delays $d_n^{(j)}$ and the respective averaged delay profile values $g_{d_n^{(j)}}^{(j)}$. center of gravity based computation may be used, which yields the path searcher window start position as $$l^{(j)} = \frac{\sum_n d_n^{(j)} g_{d_n^{(j)}}^{(j)}}{\sum_n g_{d_n^{(j)}}^{(j)}} - L_{offset},$$

where for example $$L_{offset} = \frac{L_{ps}}{3} \cdot L_{ps}$$

is the window length at 1-chip resolution.

Alternatively, modified center-of-gravity measures or an energy-capture-based window placement approach could be utilized."

As normally in a path searcher, the instantaneous delay profile of the path searcher window is computed in step 110, and the peaks in the delay profile are found in step 111. In step 112 the path searcher peak regions are refined using the tuning fingers to yield a $$\frac{1}{M}$$

-chip-precision disjoint instantaneous delay profile. In step 113 the (refined) instantaneous delay profile positions overlapping with the current partial average delay profile buffer are accumulated into the partial average delay profile buffer. This may be performed similarly to step 104 described above.

Then in step 114, a peak detection is performed in the total partial average delay profile plus the non-overlapping part of the instantaneous delay profile. This may be performed similarly to step 105 described above.

Thus having found the peaks, steps 106, 107 and 108 are performed similarly to the tracking cycle, so that the path delays are reported.

In some embodiments, the path searcher window may periodically be placed outside the nominal path searcher placement region, to ensure detection of new regions of activity over the whole search range.

As mentioned, the proposed solution maintains the advantages of the full averaged delay profile buffer to a large degree, but these advantages are now achieved without requiring extensive memory and data transfer resources, which would be necessary for a method storing the full averaged delay profile image.

As an example, a hypothetical receiver is considered with the following parameters: search area of length 256 chips, ¼-chip resolution, 10 tuning fingers, and soft handover with 3 base stations. In this case, the required storage is reduced from 6144 words to 420 words. The amount of data transferred out of the path searcher hardware stage in the receiver is reduced about 4 times, and the linked list data structure allows efficient arrangement of the data and reduces the required housekeeping complexity.

Successful operation of the solution under various channel models has been verified by computer simulations. It has been seen that the performance loss compared to using the full averaged delay profile is less than 0.5 dB when the stored regions are chosen sufficiently wide.

As mentioned, the devices described above are typically adapted for use in a WCDMA system. However, the approach can be adopted at any receiver where the individual multipath components are tracked, and channel update signals are required, e.g. any direct sequence-CDMA transmission system.

It is also noted that both complex channel coefficients and power (magnitude) estimates may be used by the algorithm. Further, path signal-to-interference estimates may be used as, or instead of, path magnitude estimates.

Further, the averaging time constant may be controlled by information derived internally in the delay estimator block or by external signals. It may be the same for all delays or it may be position-dependent (i.e. determined by the estimated age of the path).

Different path resolving algorithms may be used, such as peak detection, successive subtraction, or comb filtering, etc.

The path searcher window placement may be based on center of gravity, average delay, power capture, etc.

Although a preferred embodiment of the present invention has been described and shown, the invention is not restricted to it, but may also be embodied in other ways within the scope of the subject-matter defined in the following claims.

The invention claimed is:

1. A method of detecting multipath components in a time-varying fading radio channel in a digital wireless communications system, comprising:
   receiving individual multipath components of a signal transmitted through the channel with individual delays ($T_a$, $T_b$, $T_c$) within a range of possible delay values;
   calculating repetitively, an instantaneous delay profile indicating an instantaneous magnitude ($g/(T)$) for each of a number of individual delay values (T);
   generating an averaged delay profile from a number of repetitively calculated instantaneous delay profiles, the averaged delay profile indicating an averaged magnitude for the number of individual delay values, wherein the averaged delay profile is limited to delay values in a subset ($W_1$, $W_2$, $W_3$) of the range of possible delay values and further wherein the generation of the averaged delay profile is limited to delay values situated in regions ($W_1$, $W_2$, $W_3$) around currently estimated multipath components and the limited averaged delay profile is generated repetitively at a first rate, and a search for new multipath components is performed repetitively at a rate lower than the first rate;
   estimating from the averaged delay profile the delay of each individual multipath component; and
   using at least some of the estimated delays for RAKE combining.

2. The method according to claim 1, wherein the search further comprises the steps of:
   computing a position for a search window from the limited averaged delay profile;
   calculating an instantaneous search delay profile indicating an instantaneous magnitude (g(T)) for each delay value (T) in the search window;
   detecting peaks in the instantaneous search delay profile; and
   including, if peaks are detected outside the regions of the limited averaged delay profile, delay values in a region around such peaks in the limited averaged delay profile.

3. A method of detecting multipath components in a time-varying fading radio channel in a digital wireless communications system, comprising:
   receiving individual multipath components of a signal transmitted through the channel with individual delays ($T_a$, $T_b$, $T_c$) within a range of possible delay values;
   calculating repetitively, an instantaneous delay profile indicating an instantaneous magnitude (g(T)) for each of a number of individual delay values (T);
   generating an averaged delay profile from a number of repetitively calculated instantaneous delay profiles, the averaged delay profile indicating an averaged magnitude for the number of individual delay values, wherein the averaged delay profile is limited to delay values in a subset ($W_1$, $W_2$, $W_3$) of the range of possible delay values and further wherein the generation of the averaged delay profile is limited to delay values situated in regions ($W_1$, $W_2$, $W_3$) around currently estimated multipath components:
   estimating from the averaged delay profile the delay of each individual multipath component:
   using at least some of the estimated delays for RAKE combining; and
   storing, for each individual multipath component, a center position ($x_n$) of the region around such multipath component, a location of neighboring multipath Components ($q_{left_n}$, $q_{right_n}$), and delay profile magnitudes for each delay value situated in the region.

4. The method according to claim 3, further comprising storing, for each individual multipath component, a flag ($f_n$) indicating whether such multipath component corresponds to a newly included region in the limited averaged delay profile.

5. A receiver configured to detect multipath components in a time-varying fading radio channel in a digital wireless communications system in which individual multipath components of a signal transmitted through the channel are received with individual delays ($T_a$, $T_b$, $T_c$) within a range of possible delay values, the receiver, comprising:
   at least one hardware module configured to execute software thereon;
   the software embodied on a non-transitory computer readable medium comprising an algorithm that:
   calculates repetitively an instantaneous delay profile indicating an instantaneous magnitude (g(T)) for each of a number of individual delay values (T);
   generates an averaged delay profile from a number of repetitively calculated instantaneous delay profiles, the averaged delay profile indicating an averaged magnitude for the number of individual delay values and wherein the averaged delay profile is limited only to delay values in a subset ($W_1$, $W_2$, $W_3$) of the range of possible delay values;

estimates from the averaged delay profile the delay of each individual multipath component uses at least some of the estimated delays for RAKE combining:

limits the generation of the averaged delay profile to delay values situated in regions ($W_1$, $W_2$, $W_3$) around currently estimated multipath components and generates the limited averaged delay profile repetitively at a first rate, and executes a search algorithm that performs a search for new multipath components repetitively at a rate lower than the first rate;

the search algorithm being configured to:

compute a position for a search window from the limited averaged delay profile; calculate an instantaneous search delay profile indicating an instantaneous magnitude ($g(T)$) for each delay value ($T$) in the search window;

detect peaks in the instantaneous search delay profile; and include, if peaks are detected outside the regions of the limited averaged delay profile, delay values in a region around such peaks in the limited averaged delay profile.

6. A receiver configured to detect multipath components in a time-varying fading radio channel in a digital wireless communications system in which individual multipath components of a signal transmitted through the channel are received with individual delays ($T_a$, $T_b$, $T_c$) within a range of possible delay values, the receiver, comprising:

at least one hardware module adapted to execute software thereon;

the software embodied on a non-transitory computer readable medium comprising an algorithm that:

calculates repetitively an instantaneous delay profile indicating an instantaneous magnitude ($g(T)$) for each of a number of individual delay values ($T$):

generates an averaged delay profile from a number of repetitively calculated instantaneous delay profiles, the averaged delay profile indicating an averaged magnitude for the number of individual delay values and wherein the averaged delay profile is limited only to delay values in a subset ($W_1$, $W_2$, $W_3$) of the range of possible delay values;

estimates from the averaged delay profile the delay of each individual multipath component;

uses at least some of the estimated delays for RAKE combining; and limits the generation of the averaged delay profile to delay values situated in regions ($W_1$, $W_2$, $W_3$) around currently estimated multipath components;

wherein the receiver is further adapted to store for, each individual multipath component, the center position ($x_n$) of the region around that multipath component, locations of neighboring multipath components ($q_{left_n}$, $q_{right_n}$), and delay profile magnitudes for each delay value situated in the region.

7. The receiver according to claim 6, wherein the receiver is further adapted to store, for each individual multipath component, a flag ($f_n$) indicating whether that multipath component corresponds to a newly included region in the limited averaged delay profile.

* * * * *

UNITED STATES PATENT AND TRADEMARK OFFICE
CERTIFICATE OF CORRECTION

PATENT NO. : 7,822,104 B2
APPLICATION NO. : 10/558500
DATED : October 26, 2010
INVENTOR(S) : Reial It is certified that error appears in the above-identified patent and that said Letters Patent is hereby corrected as shown below:

In Column 4, Line 57, delete "delay-profile" and insert -- delay profile --, therefor.

In Column 9, Line 50, delete "stage" and insert -- stage. --, therefor.

In Column 11, Line 61, delete "$a_t^{(j)}$" and insert -- $a_i^{(j)}$ --, therefor.

In Column 12, Line 2, delete "manner" and insert -- manner: --, therefor.

In Column 13, Line 36, delete "$g_i^{(i+j)}$." and insert -- $g_i^{(j+1)}$. --, therefor.

In Column 14, Line 19, delete "center" and insert -- A center --, therefor.

In Column 15, Line 51, in Claim 1, delete "$(T_a, T_b, T_c)$" and insert -- $(\tau_a, \tau_b, \tau_c)$ --, therefor.

In Column 15, Line 53, in Claim 1, delete "$(g/(T))$" and insert -- $(g(\tau))$ --, therefor.

In Column 15, Line 54, in Claim 1, delete "$(T);$" and insert -- $(\tau);$ --, therefor.

In Column 16, Line 11, in Claim 2, delete "$(g(T))$" and insert -- $(g(\tau))$ --, therefor.

In Column 16, Line 12, in Claim 2, delete "$(T)$" and insert -- $(\tau)$ --, therefor.

In Column 16, Line 23, in Claim 3, delete "$(T_a, T_b, T_c)$" and insert -- $(\tau_a, \tau_b, \tau_c)$ --, therefor.

In Column 16, Line 25, in Claim 3, delete "$(g(T))$" and insert -- $(g(\tau))$ --, therefor.

In Column 16, Line 26, in Claim 3, delete "$(T);$" and insert -- $(\tau);$ --, therefor.

In Column 16, Line 36, in Claim 3, delete "components:" and insert -- components; --, therefor.

In Column 16, Line 38, in Claim 3, delete "component:" and insert -- component; --, therefor.

In Column 16, Lines 43-44, in Claim 3, delete "Components" and insert -- components --, therefor.

In Column 16, Line 54, in Claim 5, delete "$(T_a, T_b, T_c)$" and insert -- $(\tau_a, \tau_b, \tau_c)$ --, therefor.

In Column 16, Line 62, in Claim 5, delete "$(g(T))$" and insert -- $(g(\tau))$ --, therefor.

In Column 16, Line 63, in Claim 5, delete "$(T);$" and insert -- $(\tau);$ --, therefor.

In Column 17, Line 5, in Claim 5, delete "component" and insert -- component; --, therefor.

In Column 17, Lines 6-7, in Claim 5, delete "combining:" and insert -- combining; --, therefor.

Signed and Sealed this
Fifth Day of April, 2011

David J. Kappos
*Director of the United States Patent and Trademark Office*

CERTIFICATE OF CORRECTION (continued)
U.S. Pat. No. 7,822,104 B2

In Column 17, Line 19, in Claim 5, delete "(g(T))" and insert -- (g($\tau$)) --, therefor.

In Column 17, Line 19, in Claim 5, delete "(T)" and insert -- ($\tau$) --, therefor.

In Column 17, Line 29, in Claim 6, delete "($T_a$, $T_b$, $T_c$)" and insert -- ($\tau_a$, $\tau_b$, $\tau_c$) --, therefor.

In Column 18, Line 4, in Claim 6, delete "(g(T))" and insert -- (g($\tau$)) --, therefor.

In Column 18, Line 5, in Claim 6, delete "(T):" and insert -- ($\tau$); --, therefor.

In Column 18, Line 20, in Claim 6, delete "store for," and insert -- store, for --, therefor.